United States Patent [19]

Nakajima et al.

[11] Patent Number: 5,181,163
[45] Date of Patent: Jan. 19, 1993

[54] METHOD AND APPARATUS FOR GENERATING AND/OR UPDATING COOCCURRENCE RELATION DICTIONARY

[75] Inventors: Hiroyuki Nakajima, Kyoto; Hiroyuki Kaji, Tama, both of Japan

[73] Assignee: Hitachi, Ltd., Tokyo, Japan

[21] Appl. No.: 387,598

[22] Filed: Jul. 31, 1989

[30] Foreign Application Priority Data

Aug. 3, 1988 [JP] Japan .................... 63-192751

[51] Int. Cl.⁵ .................................... G06F 15/38
[52] U.S. Cl. ........................ 364/419; 364/DIG. 1; 364/226.4; 364/DIG. 2; 364/975; 364/920.4
[58] Field of Search ............. 364/419, 226.4, 975, 364/920.4

[56] References Cited

U.S. PATENT DOCUMENTS

| | | | |
|---|---|---|---|
| 4,502,128 | 2/1985 | Okajima et al. | 364/900 |
| 4,791,587 | 12/1988 | Doi | 364/900 |
| 4,805,100 | 2/1989 | Ozeki | 364/419 |
| 4,942,526 | 7/1990 | Okajima et al. | 364/419 |

Primary Examiner—Jerry Smith
Assistant Examiner—Jim Trammell
Attorney, Agent, or Firm—Fay, Sharpe, Beall, Fagan, Minnich & McKee

[57] ABSTRACT

A method of and an apparatus for generating and/or updating a cooccurrence relation dictionary in a natural language processing system such as a machine translation system including an input/output device, a memory for storing therein dictionary information, and a processor for processing an input sentence by use of the dictionary information. In the system, a syntactic analysis is performed on the input sentence, ambiguity is examined on each possible pair of words included in the result of the syntactic analysis, and only pairs of words determined to be free from ambiguity based on the result of the examination is converted into information of a predetermined format so as to register the converted information to the cooccurrence relation dictionary for a source language.

12 Claims, 6 Drawing Sheets

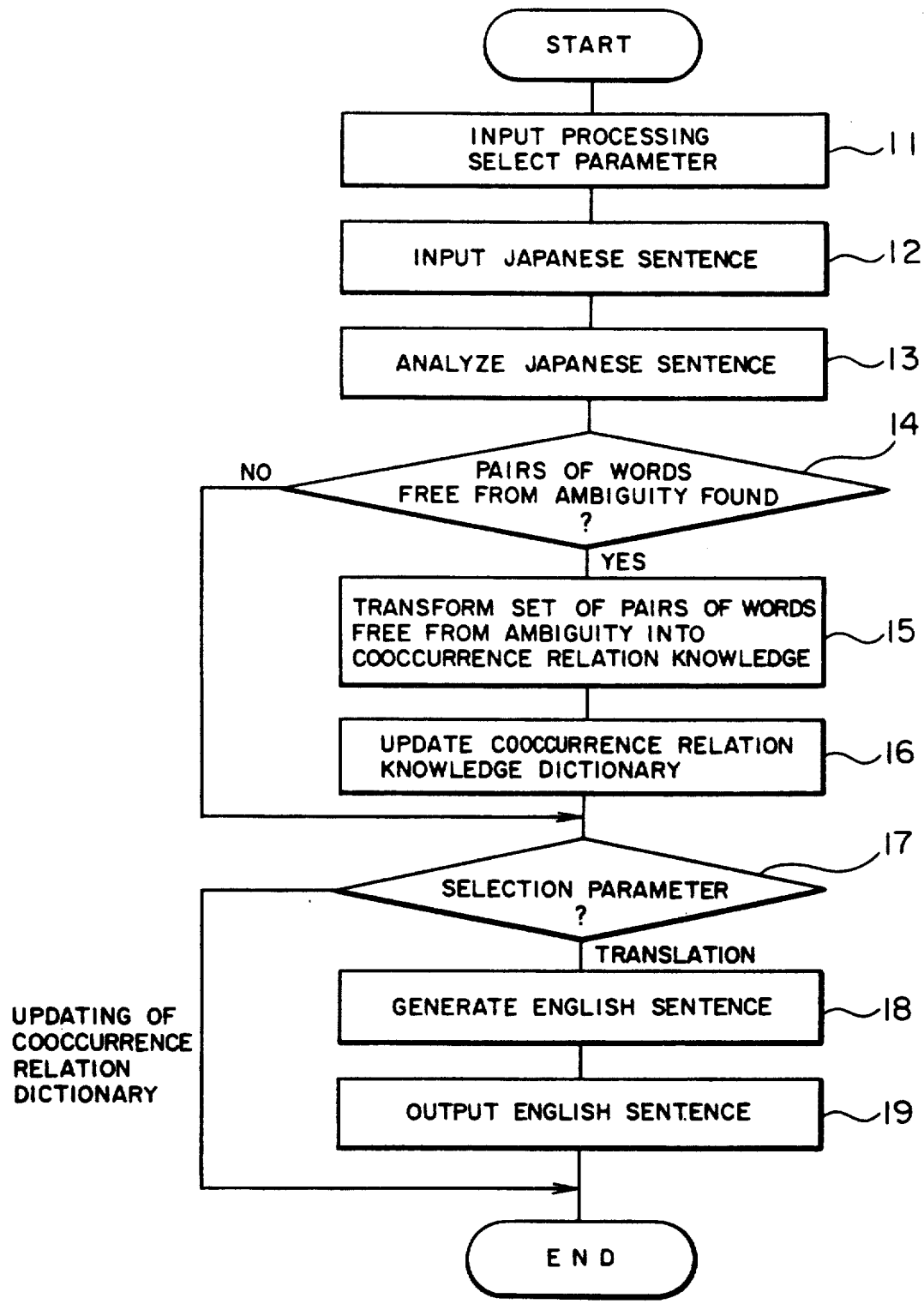

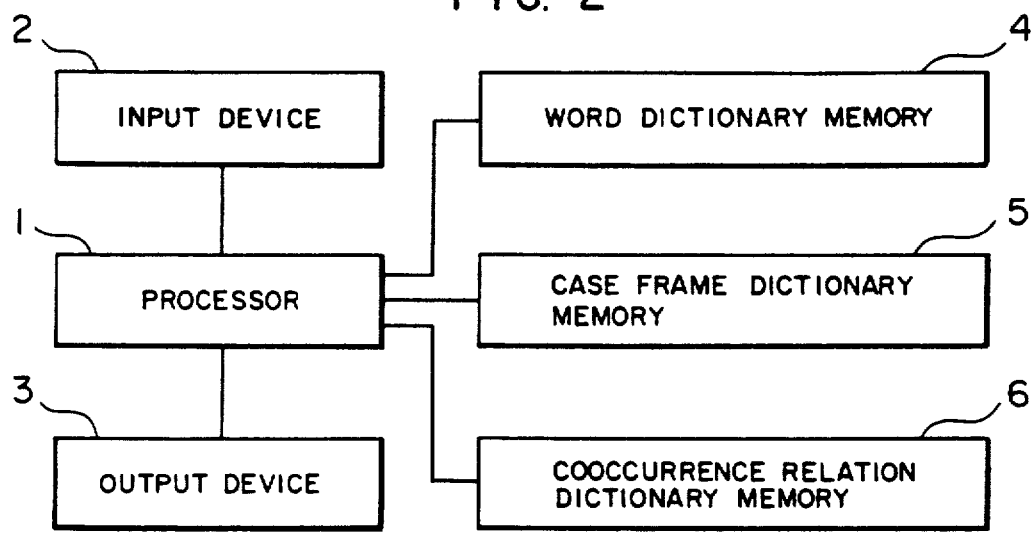

FIG. 4

| CODE NAME 51 | DEEP CASE 52 | SURFACE CASE 53 | SEMANTIC FEATURE CODE OF ARGUMENT 54 |
|---|---|---|---|
| AAA | A | が GA . S | ARBITRARY |
| | O | を O . D | ARBITRARY |
| | G | に NI . TO | CNTN |

FIG. 5A

| VERB IN JAPANESE 61 | NOUN IN JAPANESE 62 | DEEP CASE 63 |
|---|---|---|
| 入力する NYŪRYOKUSURU | データ DĒTA | O |

FIG. 5B

| 入力する NYŪRYOKUSURU | データ DĒTA | O |
|---|---|---|
| 入力する NYŪRYOKUSURU | 人 HITO | A |

FIG. 5C

| 入力する NYŪRYOKUSURU | データ DĒTA | O |
|---|---|---|
| 入力する NYŪRYOKUSURU | 人 HITO | A |
| 入力する NYŪRYOKUSURU | 値 ATAI | O |

METHOD AND APPARATUS FOR GENERATING AND/OR UPDATING COOCCURRENCE RELATION DICTIONARY

BACKGROUND OF THE INVENTION

The present invention relates to a natural language processing technology for a machine translation system and the like, and in particular, to a method of and an apparatus for automatically generating and/or updating a cooccurrence relation dictionary for a source language.

In a natural language processing system, cooccurrence of words defines two words, primarily, a verb and a noun which are combined with each other through a particular case relation such as an agent and an object and appear in a sentence at the same time. For two words, if the cooccurrence takes place, it is defined that these two words have a cooccurrence relation therebetween. Utilization of knowledge and information about the cooccurrence relation is quite effective to improve the quality of results of processing conducted in the natural language processing system such as a machine translation system and a word processor. Knowledge about the cooccurrence relation is ordinarily supplied as a cooccurrence relation dictionary to the system. The cooccurrence relation dictionary is provided to store therein combinations each including words associated with each other through a cooccurrence relation. Heretofore, the cooccurrence relation dictionary is prepared through a manual operation; furthermore, the updating operations such as addition, deletion, and revision thereof are carried out by use of a human power.

There exist a great amount of combinations of words having the cooccurrence relations therebetween, and in addition, a necessary range of the knowledge of cooccurrence relations is also difficult to decide. Moreover, the required range varies depending on a field related to contents of words to be primarily processed by each system. Consequently, it is necessary to efficiently collect a large volume of the knowledge of cooccurrence relations and further to conduct, after the system is established, an appropriate updating on the collected knowledge. The collection and updating manually accomplished in the conventional system are quite ineffective, and it is difficult to appropriately cope with the discrepancies among the knowledge items having the cooccurrence relations due to difference in the respective fields. The generating/updating technology of the cooccurrence relation dictionary of the natural language has been described in the U.S. application Ser. No. 922,889 filed on Oct. 24, 1986 now U.S. Pat. No. 4,942,564 and assigned to the present assignee, which is hence incorporated in the disclosure of the present invention by reference thereof.

SUMMARY OF THE INVENTION

It is therefore an object of the present invention to provide a method and an apparatus capable of efficiently achieving the generation and updating of a cooccurrence relation dictionary for a particular field with a minimized amount of human power.

Another object of the present invention is to provide a method and a system capable of effectively conducting the generation and/or updating of a cooccurrence relation dictionary suitable for each field.

According to a feature of the present invention, in order to achieve the object above, there is basically included a processing step for effecting a syntactic analysis on an input sentence or a read-out sentence, a processing step for inspecting or examining ambiguity of pairs of words included in a result of the syntactic analysis with respect to a semantic relation between paired words, and a processing step for converting only the pairs of words determined not to be ambiguous into a predetermined format so as to register the result in to a cooccurrence relation dictionary. In addition, there is provided a natural language processing apparatus comprising means for executing these processing steps.

According to a method of processing to inspect ambiguity in pairs of words, whether or not a pair of words is ambiguous can be judged depending on whether or not the pair of words is commonly included in several possible results of the syntactic analysis conducted thereon. There may be additionally provided an update processing for automatically effecting, by use of the contents of the cooccurrence relation dictionary thus accumulated, an updating on a case frame dictionary, which is defined as information representing case relations between a predicate word and a noun governed by the word.

The above method may be independently accomplished as a generating processing and/or as an updating processing on the cooccurrence relation dictionary or may be carried out in a process of the translation processing. In the case of the translation processing, the results of the syntactic analysis for the translation may be adopted also for the generation/updating of the cooccurrence relation dictionary in concurrence with the language translation. Furthermore, the system may be configured such that the user is allowed to selectively specify whether only the generation/updating of the cooccurrence relation dictionary is to be achieved or the translation as well as the generation/updating of the cooccurrence relation dictionary are to be effected.

In the execution of the processing steps according to the present invention, when the user supplies as an input an appropriate textual sentence so as to initiate the cooccurrence relation dictionary generate/update processing system, only cooccurrence relation information free from ambiguity is automatically extracted from the textual sentence and the extracted information is registered to the cooccurrence relation dictionary. Alternatively, in a machine translation system to which the present invention is applied, through the daily procedure of the translation processing, cooccurrence relation information free from ambiguity is automatically extracted so as to be registered to the cooccurrence relation dictionary. In consequence, with quite a minimized volume of human labor, it is possible to generate a more appropriate cooccurrence relation dictionary or to further improve the dictionary such that the dictionary contains appropriate comprehensive information.

By additionally providing a case frame dictionary update processing, a plurality of cooccurrence relation information items related to a particular verb are generalized as general-purpose case frame information items. In consequence, it is possible to transfer such generalizable information items to the respective frame dictionaries so that they may be removed from the cooccurrence relation dictionary, and hence the storage area of the cooccurrence relation dictionary can be efficiently utilized.

BRIEF DESCRIPTION OF THE DRAWINGS

These and other objects and advantages of the present invention will become apparent by reference to the following description and accompanying drawings wherein:

FIGS. 1A and 1B are schematic diagrams respectively showing, in a form of a flowchart and in a PAD format, an embodiment in which the present invention is applied to a Japanese-English machine translation system;

FIG. 2 is a block diagram schematically showing a hardware configuration of the Japanese-English machine translation system;

FIG. 3 is a schematic diagram showing an example of contents of records of a word dictionary;

FIG. 4 is a schematic diagram showing an example of contents of case frame records;

FIG. 5A-C is a schematic diagram showing an example of contents of records of a cooccurrence relation dictionary.

DESCRIPTION OF THE PREFERRED EMBODIMENTS

Figure 1B:
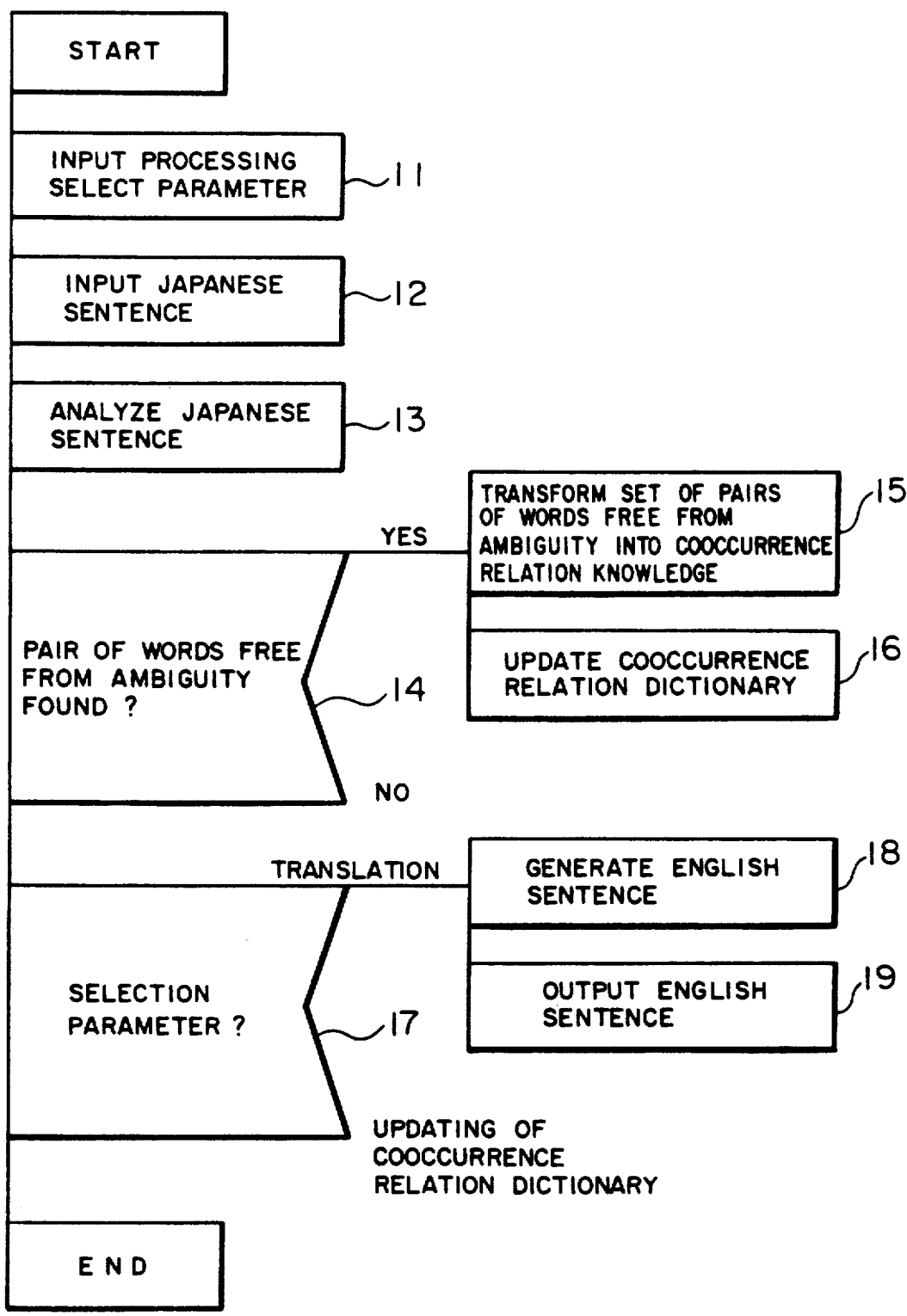

Referring now to the drawings, description will be given of an embodiment with reference to an example of a Japanese-English machine translation system according to the present invention.

FIG. 2 shows a hardware configuration of this system, which includes a processor 1 and an input device 2, an output device 3, a word dictionary memory 4, a case frame dictionary memory 5, and a cooccurrence relation dictionary memory 6 respectively connected to the processing apparatus 1.

The word dictionary memory 4 includes a word dictionary constituted with, for example, records of FIG. 3. Each record includes a Japanese entry 41, a part of speech 42, an English equivalent 43, a semantic feature code 44, and a case frame code 45. The semantic feature code 44 designates a semantic category of a noun, namely, ANI, OBJ, and CNTN indicate an animal, an object, and a container, respectively. The case frame code 45 includes information identifying a record of a case frame, which will be described later. A word dictionary record can be retrieved by use of the Japanese entry 41 as a key of the retrieval.

The case frame dictionary memory 5 includes a case frame dictionary constituted with records in the format of FIG. 4. Each record comprises a case frame code name 51, deep cases 52, surface cases 53, and semantic feature codes 54 of an argument (a noun governed by a verb having this case frame). The deep case is assigned with codes A, O, G, and I, which respectively designate an agent, an object, a goal, and an instrument. The surface case is represented in Japanese by use of "Joshi", a Japanese particle, or a post-positional word as an auxiliary to a main word and in English by use of a syntactic role or a preposition. In FIG. 4, letters S and D stand for abbreviations of a subject and a direct object, respectively. A case frame code can be retrieved by use of the case frame code name 51 as a key for the retrieval.

The cooccurrence relation dictionary memory 6 includes a cooccurrence relation dictionary including records of FIG. 5. Each record comprises a verb in Japanese 61, a noun in Japanese 62, and a deep case 63. A record of the cooccurrence relation dictionary can be retrieved by use of a combination of the verb in Japanese 61 and the noun in Japanese 62 as a key for the retrieval. In the cooccurrence relation dictionary, there is registered, as pairs each including a verb and a noun, a cooccurrence relation which is unique to a verb and which is not expressed by use of the case frame, and hence the content thereof is preferentially employed to the case frame in the processing to analyze Japanese sentences.

Referring next to FIGS. 1A and 1B, description will be given of the translation processing achieved by means of the processor 1. First, there is inputted from the input device 2 a processing select parameter specifying either one of the translation and the cooccurrence relation dictionary updating (step 11). Subsequently, a Japanese sentence is supplied from the input device 2 (step 12). Referencing the word dictionary, the case frame dictionary, and the cooccurrence relation dictionary, there is effected a pattern matching between a surface case (postpositional word or a Japanese particle) and a semantic feature code of an argument in the input sentence and a surface case (postpositional word or a Japanese particle) and a semantic feature code in a corresponding case frame record so as to attain an intermediate representation as a set of pairs of words with a semantic relation to each other. Each pair is represented by e.g. 3-tuples of predicate, argument and deep case.

In this situation, if a plurality of analyses are possible, the system obtains all of the intermediate representations each of which is associated with each of all the analyses (step 13). Next, the pairs of words constituting the intermediate representations thus obtained in the step 13 are inspected to determine intermediate representations free from ambiguity. Only pairs of words included in all intermediate representations thus attained are determined to be free from ambiguity. In other words, for a pair of words, if and only when any one of the obtained intermediate representations includes the pairs of words, it is assumed that the pair of words is ambiguous.

For the inspection of ambiguity, there may be adopted, for example, a technology described in the U.S. application Ser. No. 226,047 entitled "Method of and System for Analyzing an Input Sentence", filed on Jul. 29, 1988, and assigned to the present assignee.

Judgement of ambiguity of a pair or words will be described here by use of the intermediate representation.

Assume that an input sentence is "(a) wapuro de, (b) honyakushita, (c) bunsho o, (d) shuseisuru," namely, "(d) Correct, (c) a document, (b) translated, (a) by use of a word processor." One of the analysis results of the input sentence is expressed as below:

$$\left\{ \begin{array}{l} <\text{translate, word processor, } I>, \\ <\text{translate, document, } O>, \\ <\text{correct, document, } O>, \end{array} \right\}$$

An analysis result or intermediate representation is composed of a set of 3-tuples of predicate, argument and deep case. In this example, the analysis result of the input sentence is represented by a set of three 3-tuples such as a 3-tuple <translate, word processor, I> which represents that "word processor" is coupled with "translate" in a relation of a deep case of I. It is clear that "correct" has "document" as an object because only "correct" appears to govern "a document". It is ambiguous whether "by use of a word processor" is dependent on "translated" or to "correct". Consequently, 3-tuples <correct, word processor, I> and <translate, word processor, I>, are both ambiguous. It is clear that "translated" is dependent on "a document"; however, the semantic (or case) relation therebetween is ambiguous. That is, whether an expression <translate, document, O> or <translate, document, A> is to be employed is ambiguous. As a result, in this embodiment, only the expression <correct, document, O> can be registered as a pair of words free from ambiguity to the cooccurrence relation dictionary.

In the case where all pairs of words included in all intermediate representations are ambiguous, control branches to step 17. If there exist any pair of words free from ambiguity, the processing proceeds to step 15 (step 14). A set of pairs of words judged to be free from ambiguity in the step 14 is transformed into cooccurrence relation knowledge in a format adaptive to the contents of the cooccurrence relation dictionary (step 15). The cooccurrence relation knowledge is then registered to the cooccurrence relation dictionary (step 16). If the processing select parameter inputted in the step 11 indicates "updating of the cooccurrence relation dictionary", the processing is terminated (step 17). If the processing select parameter indicates "translation", the word dictionary and the case frame are referenced so as to determine a syntactic role of an argument based on English grammar information of the verb, thereby generating an English sentence from the intermediate representation attained in the step 13. If there exist a plurality of intermediate representations, the first obtained intermediate representation is adopted for the creation of the sentence (step 18). Finally, the generated English sentence is delivered to the output device 3 (step 19).

Next, description will be given in detail of the processes of the Japanese language analysis and acquisition of the cooccurrence relation knowledge with reference to examples in using the word dictionary of FIG. 3, the case frame of FIG. 4, and the cooccurrence relation dictionary of FIG. 5.

Assume here that "translation" is selected by use of a processing select parameter and that a sentence is inputted in Japanese as "hito ga nyūryoku suru (an operator conducts an input operation or a man inputs it.)" The system first effects a retrieval through the word dictionary so as to disassemble the input sentence into a sequence of words. Next, in order to determine a deep case of the argument "an operator" of the verb "conducts (an input operation)", a retrieval is effected on the cooccurrence relation dictionary by use of a combination of "conduct (an input operation)" and "an operator" as a key for the retrieval. The cooccurrence relation dictionary of FIG. 5A does not contain a record having the key. In this situation, since a record (FIG. 3) having "conduct (an input operation)" as a key possesses a case frame code [AAA], the case frame is subjected to a retrieval by use of [AAA] as a key. A record (FIG. 4) having [AAA] as a key in the case frame memory 5 includes a first pattern indicating that the surface case of the Japanese language (Japanese particle) is "ga" and that the deep case of the argument having an arbitrary semantic feature code is A. On the other hand, there are shown that the Japanese particle indicating the surface case of the noun "hito (an operator)" in the input sentence is "ga" and that for a record having "hito (an operator)" as a key in the word dictionary memory 4, a semantic feature code of the "hito (an operator)" is ANI (animal). In consequence, the pattern of the input sentence matches with the first pattern of the case frame record of FIG. 4, thereby attaining an analysis result { <nyūryoku suru (input), hito (operator), A> }. In this embodiment, the intermediate representation as the analysis result is to be expressed with a set of 3-tuples in a form of <predicate, argument, deep case>. Two remaining patterns of the case frame record having [AAA] as a key do not match with the pattern of the input sentence because the Japanese particles thereof are respectively "o" and "ni". As a result, there is determined only one intermediate representation of <nyūryoku suru (input), hito (operate), A> including only one pair of words. Since only one intermediate representation is obtained, it is judged that the pair of words is free of ambiguity, and hence the pair of words is transformed into a format of a cooccurrence relation corresponding to a record of the cooccurrence relation dictionary and is then registered as a new record thereto, thereby updating the cooccurrence relation dictionary as shown in FIG. 5B.

If "translation" is inputted as the processing select parameter, the attained intermediate representation is employed to produce an English statement so as to output a statement of 'A man inputs it.' If the processing select parameter indicates "updating of the cooccurrence relation dictionary", the processing is completed only by achieving the updating of the cooccurrence relation dictionary.

Description will now be given of an example to process another sentence described in Japanese.

In the case where the input sentence is "hito ga atai o nyūryoku suru (A man inputs a value)", the similar analysis is conducted to obtain only one result of { <input, man, A>, <input, value, O> }, and hence a new cooccurrence relation is registered to the cooccurrence relation dictionary as shown in FIG. 5C.

Next, let us consider the case where the input sentence is "nyūryoku sita atai (an inputted value)". The analysis of the cooccurrence relation is carried out on the original form of the verb "nyūryoku suru (input)". If the cooccurrence relation dictionary is configured as shown in FIG. 5A, a record having as a key a combination of "nyūryoku suru (input)" and "atai (value)" is missing in the dictionary. Furthermore, there is not found a Japanese particle indicating a surface case of the "atai (value)" for the "nyūryoku suru (input)", and hence the two leading patterns of the case frame record (FIG. 4) having [AAA] as a key match with the pattern of the input sentence. For the third pattern, the semantic feature code associated with the argument is CNTN (container) and hence, does not match with the semantic feature code OBJ (object) of the "atai (value)". In consequence, there are obtained two kinds of analysis results as <nyūryoku suru (input), atai (value), A> and <nyūryoku suru (input), atai (value), O>. In this situation, the two pairs of words included in the analysis results do not appear in both of the analysis results at the same time, and hence these pairs of words are judged to be ambiguous and are not registered to the cooccurrence relation dictionary. However, in the translation processing, as determined above, the operation is carried out by adopting the first analysis result <nyūryoku suru (input), atai (value), A> and in consequence there is attained a wrong output sentence 'the inputting value.'

However, if the cooccurrence relation dictionary has been appropriately updated as shown in FIG. 5C, based on the contents of a record having as a key a combination of "nyūryoku suru (input)" and "atai (value)", the analysis result is determined as <nyūryoku suru (input). atai (value), O>. As a result, there is attained a correct output sentence 'the inputted value.'

In accordance with the embodiment above, when the translation processing is executed, the cooccurrence relation dictionary is also reinforced for further use. When the machine translation system is free, if required, the operator may change the processing select parameter to the updating mode for updating the cooccurrence relation dictionary so as to input an exemplifying sentence, thereby achieving an operation to reinforce the cooccurrence relation dictionary.

As an expansion of the embodiment above, there may be conducted an operation such that when a certain amount of cooccurrence relation knowledge related to a plurality of verbs possessing a common case frame is accumulated in the cooccurrence relation dictionary, the case frame is automatically updated by use of a semantic feature codes of arguments. For example, in the cooccurrence relation dictionary, there has been stored knowledge that a cooccurrence of two words including "deta (data)" and "atai (value)" takes place in association with a verb "nyūryoku suru (input)" and a deep case O. Furthermore, the word dictionary of FIG. 3 indicates that the two words including "deta (data)" and "atai (value)" has a common semantic feature code OBJ. In this situation, if an amount of data exceeding a predetermined threshold value is stored in the cooccurrence relation dictionary, the data being such that the cooccurrence takes place in association with an argument having a semantic feature code OBJ, the deep case is O and a verb has the case frame code [AAA] possessed by the verb "nyūryoku suru (input)", the content of the semantic code field of the argument associated with the deep case O of the case frame record having the code name [AAA] is updated to OBJ in FIG. 4. In addition thereto, it may be possible to delete any record in the cooccurrence relation dictionary for which the verb is "nyūryoku suru (input)", the noun has the semantic feature code OBJ, and the deep case is designated as O. According to the method above, in addition to the automatic acquisition of the new cooccurrence relation knowledge, the knowledge can be automatically generalized as case frame information, which enables the size of the memory for storing therein the cooccurrence relation dictionary to be minimized. The system may be modified such that a third processing select parameter is added thereto to specify the processing above so as to effect, by supplying the parameter to the system, the updating of the case frame dictionary and the associated rearrangement or pigeonholing of the cooccurrence relation dictionary as an independent job.

The extended example above may be specifically effected as follows.

Figure 6:
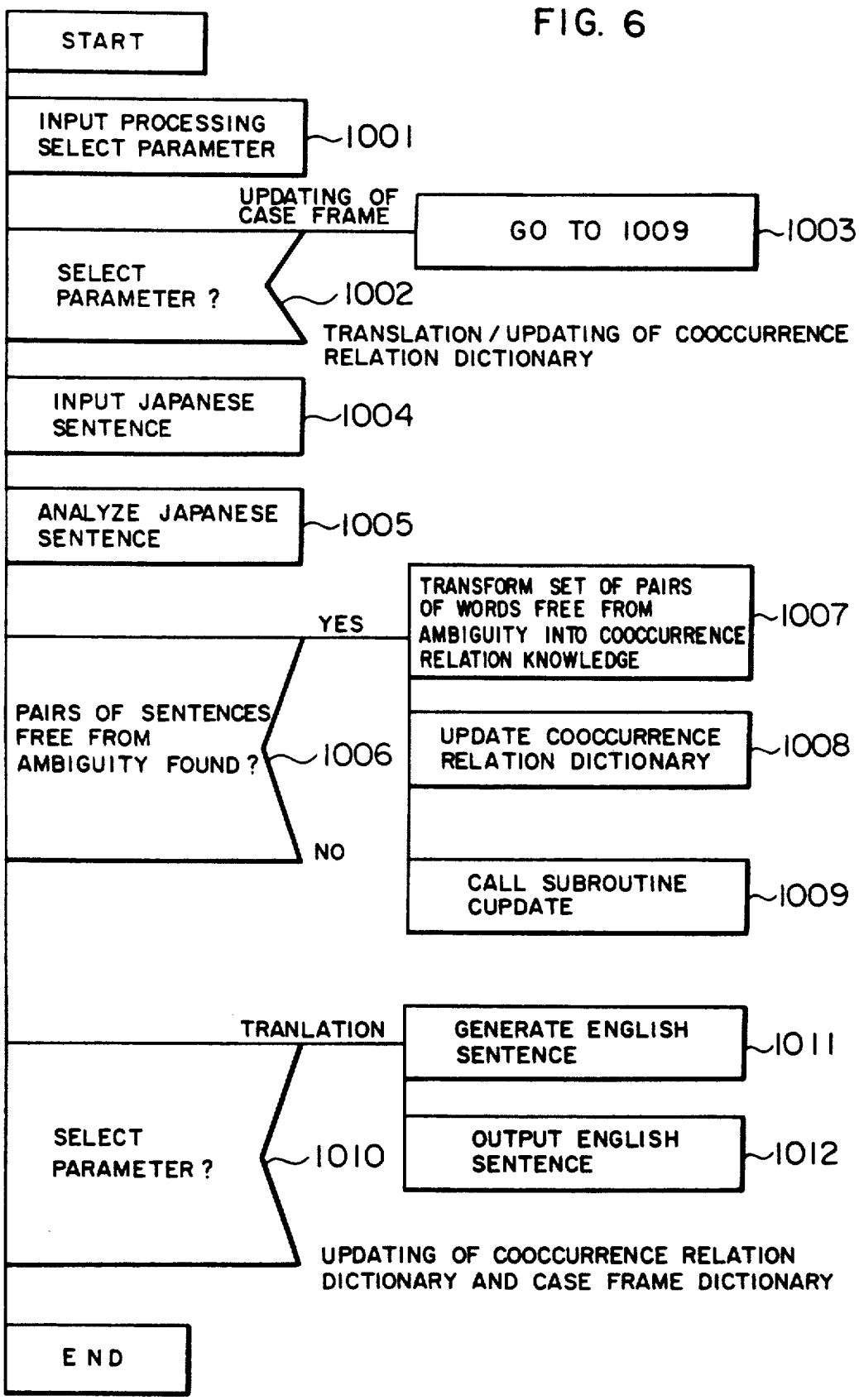
FIGS. 6 and 7 are diagrams schematically showing translation processing steps as update examples effected in the embodiment of FIG. 1.
Figure 7:
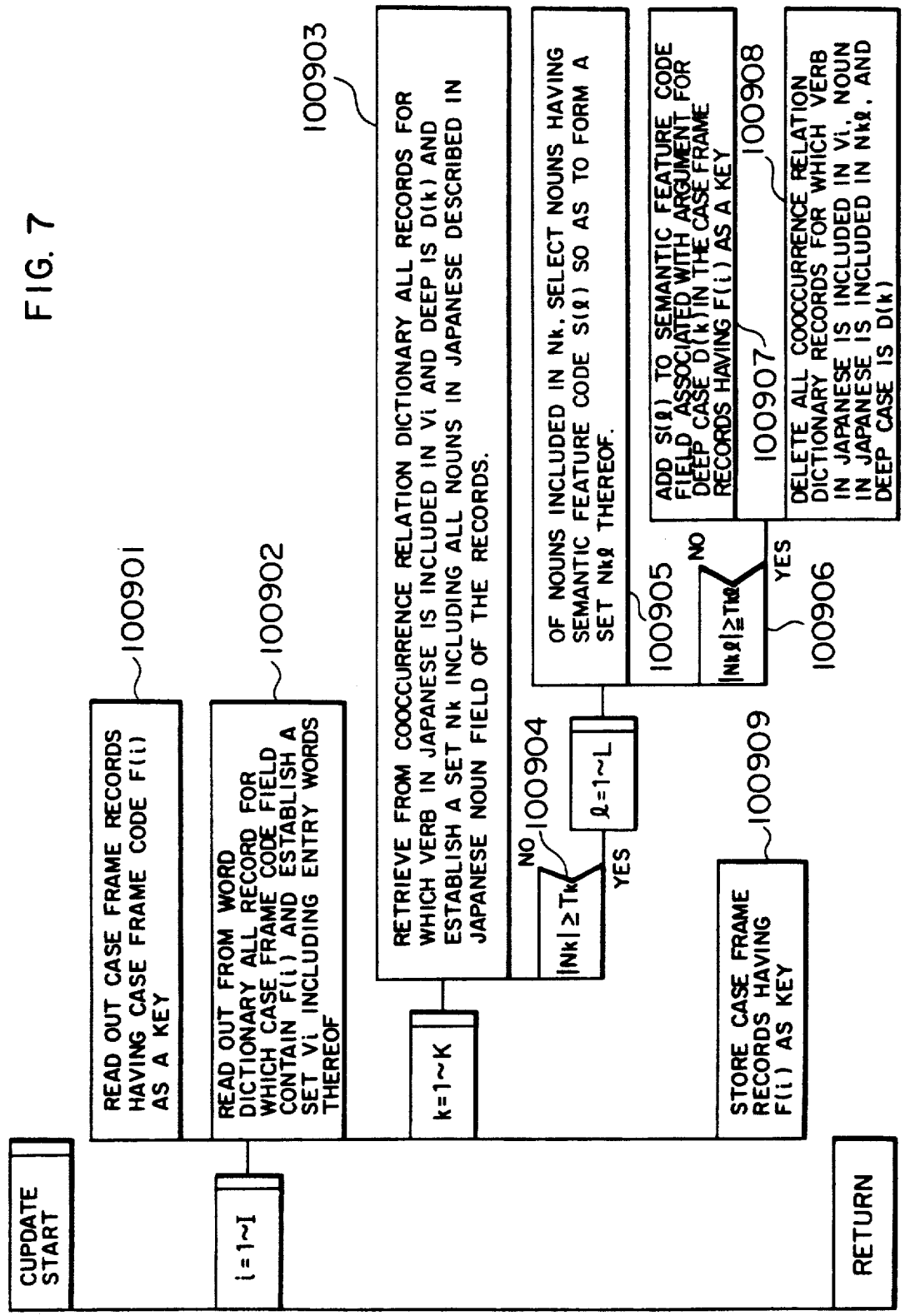

First, the translation processing of FIG. 1B is altered as shown in FIGS. 6 and 7. In this situation, description will be made of the flow of processing in accordance with the embodiment with reference to FIGS. 6 and 7.

A processing select parameter is supplied from the input device 2, where the parameter may specify one of the following three kinds including the translation mode, the cooccurrence relation dictionary update mode and the case frame dictionary update mode (step 1001). Subsequently, the processing select parameter supplied in the step 1001 is checked, and if the value thereof indicates "the case frame dictionary update mode", the processing proceeds to step 1003 and then control skips to step 1009; whereas, if the value designates "the translation mode" or "the cooccurrence relation dictionary update mode", control proceeds to step 1004 (step 1002).

Processings of the steps 1004 to 1008 are respectively identical to the processings of the steps 12 to 16 of FIG. 1B.

In the step 1009, the system calls a subroutine CUPDATE which updates the case frame dictionary. Details about the processing contents of CUPDATE will be described later.

In the step 1010, it is checked to judge the processing select parameter inputted in the step 1001. If the value thereof indicates "the translation mode", the processing proceeds to step 1011; whereas, if the value designates "cooccurrence relation dictionary update mode" or "the case frame dictionary update mode", the processing is terminated (step 1010).

The processings of the step 1011 and 1012 are respectively equal to the processing steps 18 and 19 of FIG. 1B.

Referring next to FIG. 7, description will be made of the processing contents of the subroutine CUPDATE.

Assuming here that a set of case frame codes to be processed in this system is $\{F(i) | i = 1 \text{ to } I\}$. The following steps 100901 to 100909 are repeated for $i = 1$ to $I$.

The system reads from the case frame dictionary memory 5 case frame records having a case frame code F(i) as a key (step 100901).

A retrieval is conducted through the word dictionary to read out therefrom all records for which the case frame code field includes F(i) so as to establish a set Vi of entry words thereof. Since the case frame is defined only for a verb, the set Vi is a set of verbs (step 100902).

Assuming here that the deep cases to be processed in this system includes deep cases D(l) to D(K) of which the total number is K so as to repeatedly effect the following steps 100903 to 100908 for $k = 1$ to K.

From the cooccurrence relation dictionary memory 6, there are read out all records for which a verb in Japanese is included in the set Vi and the deep case is represented as D(k) so as to form a set $N_k$ constituted with a total of nouns in Japanese retrieved from the fields of noun in Japanese of the obtained records. That is, the set $N_k$ is a set of nouns for which the cooccurrence takes place with a verb having a case frame F(i) in association with the deep case D(k) (step 100903).

Assume here that the total of elements of the set $N_k$ of nouns is represented as $|N_k|$ and that a threshold value is in advance determined as $T_k$. Under the condition above, if $|N_k| \geq T_k$ holds, control proceeds to a processing loop including the steps 100905 to 100908. If $|N_k| < T_k$ results, the value of k is incremented and then control returns to the step 100903. In order words, in the case where the number of cooccurrence relations ($|N_k|$) for which the verb possesses a case frame F(i) and the deep case is D(k) is less than $T_k$, the system does not effect the updating on the case frame dictionary (step 100904).

If $|N_k| \geq T_k$ is determined in the step 100904, the following steps 100905 to 100908 are repeatedly executed for $l = 1$ to L, where L is the total number of the semantic feature codes S(l) to S(L) to be processed by the present system.

Assume here that of the nouns included in the set $N_k$, the nouns having the semantic feature code S(l) form a set $N_{kl}$. Whether or not the noun possesses the semantic feature code S(l) can be determined by effecting a retrieval through the word dictionary by use of the noun as a key so as to determine whether or not the semantic feature code field of the retrieved record contains S(l) (step 100905).

By using a threshold value $T_{kl}$ beforehand set, a judgement is conducted to determine whether or not $|N_{kl}| \geq T_{kl}$ holds. If this is the case, control proceeds to the step 100907, whereas if $|N_{kl}| < T_{kl}$ is determined, control returns to the step 100905 so as to repeatedly effect the processing until l>L occurs. That is, the system updates the case frame if $T_{kl}$ is not exceeded by the total number $|N_{kl}|$ of the cooccurrence relations for which the verb has the case frame F(i), the deep case is D(k), and the noun possesses the semantic feature code S(l). Otherwise, the updating of the case frame is not conducted (step 100906).

There is then added S(l) to the content of the semantic feature code field of the argument associated with the deep case D(k) in the case frame record read out in the step 100901. Through the processing above, $|N_{Kl}|$ cooccurrence relation records are represented by a case frame (step 100907).

Deleted from the cooccurrence relation dictionary memory 6 are $|N_{kl}|$ cooccurrence relation dictionary records for which the verb in Japanese is included in Vi, the noun in Japanese is included in $N_{kl}$, and the deep case is D(k). As a result, the size of memory occupied by the cooccurrence relation dictionary is reduced (step 100908).

Finally, the case frame record which is read out in the step 100901 and of which the content is updated in the step 100907 is stored in the case frame dictionary memory 5 (step 100909).

When the steps 100901 to 100909 are repetitiously achieved for i=1 to I, the processing of CUPDATE is completed.

According to the present invention, in association with an execution of the translation processing or as an independent generate/update processing, an operation is automatically effected in an automatic fashion to select only the correct occurrence relations from the results of the analysis conducted on the input sentence so as to register the correct cooccurrence relations to the cooccurrence relation dictionary; furthermore, the cooccurrence relations can be generalized as case frame information. As a result, the quality of the translation can be effectively improved with a minimized amount of human power.

While particular embodiments of the invention have been shown and described, it will be obvious to those skilled in the art that various changes and modifications may be made without departing from the present invention in its broader aspects.

What is claimed is:

1. A method of generating and updating a cooccurrence relation directory in a natural language processing system including an input/output device, a memory for storing therein dictionary information, and a processor for processing an input sentence by use of the dictionary information, the method comprising the steps of:

effecting a syntactic analysis on the input sentence, wherein said syntactic analysis is effected such that all possible syntactic structures are produced, each structure being expressed as a set of predicate-argument relationships;

inspecting ambiguity in predicate-argument relationships included in said input sentence, wherein said ambiguity inspection is effected such that a predicate-argument relationship which occurs in said all possible syntactic structures produced by the syntactic analysis is judged to be unambiguous;

transforming unambiguous predicate-argument relationships obtained as a result of said inspecting into information having a predetermined format; and registering said transformed unambiguous predicate-argument relationships to said cooccurrence relation dictionary.

2. A method of generating and updating a cooccurrence relation directory in a natural language processing system including an input/output device, a memory for storing therein dictionary information, and a processor for processing an input sentence by use of the dictionary information, the method comprising the steps of:

effecting a syntactic analysis on the input sentence;

inspecting ambiguity in predicate-argument relationships included in said input sentence;

transforming unambiguous predicate-argument relationships obtained as a result of said inspecting into information having a predetermined format;

registering said transformed unambiguous predicate-argument relationships to said cooccurrence relation dictionary; and updating a case frame dictionary based on a set of generalizable predicate-argument relationships contained in the cooccurrence relation dictionary stored in said memory, said case frame dictionary including information of case relations satisfiable between a predicate word and an argument thereof.

3. A natural language processing system including an input/output device, file means for storing therein dictionary information, and processing means for processing an input sentence supplied from the input/output device, using the dictionary information, said processing means comprising:

syntactic analysis means coupled to said input/output device for effecting a syntactic analysis on an input sentence to produce possible predicate-argument relationships;

ambiguity determining means responsive to said syntactic analysis means for examining ambiguity in said predicate-argument relationships;

a cooccurrence relation update means for registering in a cooccurrence relation dictionary storing cooccurrence relation information, predicate-argument relationships determined to be unambiguous by said ambiguity determining means, when said predicate-argument relationships are not included in said cooccurrence dictionary; and case frame file means for constituting therein a case frame dictionary comprising information of a case relation satisfiable between a predicate word and a noun to be governed by the word;

said processing means referencing said cooccurrence relation dictionary file means and the case frame dictionary file means so as to automatically generalize knowledge accumulated in said cooccurrence relation dictionary file into case frame information, thereby updating said case frame dictionary.

4. The natural language processing system according to claim 3 wherein said system, further comprises:

translate means for generating from a first language of the input sentence, by use of a syntactic analysis result from said syntactic analysis means, an output sentence in a second language through a translation of the input sentence; and mode select means for selectively executing each mode for said cooccurrence relation update means, said case frame dictionary update means, and said translate means.

5. A method of generating and updating a cooccurrence relation directory in a natural language processing system including an input/output device, a memory for storing therein dictionary information, and a processor for processing an input sentence by use of the dictionary information, the method comprising the steps of:

effecting a syntactic analysis on the input sentence;

inspecting syntactic ambiguity of said input sentence;

transforming syntactically unambiguous predicate-argument relationships obtained as a result of said inspecting into information having a predetermined format; and registering said transformed unambiguous predicate-argument relationships to said cooccurrence relation dictionary.

6. A method according to claim 5, further comprising a step of generating an output sentence as a translation of the input sentence based on the result of the syntactic analysis.

7. A method according to claim 6, further including a step or receiving in advance from an external device select information specifying whether or not the output sentence generate step is to be executed, said output sentence generate step being effected only when the select information specifies an execution thereof.

8. A method of automatically generating cooccurrence relation information indicating whether a pair of words in a natural language can cooccur using, a memory, sentences, and a processor, said method comprising the steps of:

providing as an input, sentences belonging to a user selected field;

effecting a syntactic analysis of an input sentence having a set of possible predicate-argument relationships, on the basis of grammatical rules to determine an intermediate representation of the input sentence;

examining ambiguity in the predicate-argument relationships on the basis of predetermined rules to determine whether each predicate-argument relationship is ambiguous or not; and selecting predicate-argument relationships which are determined to be syntactically unambiguous from the examination result by said examining, and providing the same as cooccurrence relation information to be registered in a cooccurrence relation dictionary storing cooccurrence relation information.

9. A method according to claim 8, further comprising updating said cooccurrence relation dictionary storing cooccurrence relation information in response to each providing of a pair of words determined not to have ambiguity.

10. A natural language processing system including an input/output device, file means for storing therein dictionary information, and processing means for processing an input sentence supplied from the input/output device, using the dictionary information.

said processing means comprising:

syntactic analysis means coupled to said input/output device for effecting syntactic analysis on an input sentence to produce possible syntactic structures. each of which is expressed as a set of predicate-argument relationships;

ambiguity determining means responsive to said syntactic analysis means for examining syntactic ambiguity in said predicate-argument relationships; and a cooccurrence relation update means for registering in a cooccurrence relation dictionary storing cooccurrence relation information, predicate-argument relationships determined to be syntactically unambiguous by said ambiguity determining means, when said predicate-argument relationships are not included in said cooccurrence dictionary.

11. A natural language processing system according to claim 10, wherein said ambiguity determining means includes means for examining whether each pair of words is included in a set of all possible paris of words attained as an analysis result from said syntactic analysis means to determine only pairs of words commonly included therein to be free from ambiguity.

12. A method of supplying information to a cooccurrence relation dictionary of a natural language processing system, wherein the system includes an input/output device which inputs words forming a sentence, a memory for storing information supplied to the cooccurrence relation dictionary, and a processor for processing the input words, the method comprising the steps of:

inspecting the words input by the input device which are arranged as pairs of words in a predicate-argument relationship to determine whether the pairs of words are syntactically unambiguous;

registering automatically the pairs of words determined to be syntactically unambiguous to the cooccurrence relation dictionary; and effecting a syntactic analysis on the input sentence.

* * * * *